(12) United States Patent
Numazaki et al.

(10) Patent No.: US 11,448,329 B2
(45) Date of Patent: Sep. 20, 2022

(54) VALVE DEVICE

(71) Applicant: JTEKT CORPORATION, Osaka (JP)

(72) Inventors: Kazushi Numazaki, Toyota (JP);
Takeshi Takahashi, Kashiba (JP);
Kazuhiro Takabayashi, Okazaki (JP);
Tomohiro Ishihara, Okazaki (JP);
Natsuki Iwamoto, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 16/815,059

(22) Filed: Mar. 11, 2020

(65) Prior Publication Data
US 2020/0292091 A1    Sep. 17, 2020

(30) Foreign Application Priority Data

Mar. 14, 2019   (JP) ............................. JP2019-047071

(51) Int. Cl.
*F16K 15/02* (2006.01)
*F16K 27/02* (2006.01)
*F16K 15/03* (2006.01)
*F17C 13/04* (2006.01)

(52) U.S. Cl.
CPC ........ *F16K 15/026* (2013.01); *F16K 27/0209* (2013.01); *F15B 2211/30505* (2013.01); *F16K 15/033* (2013.01); *F17C 13/04* (2013.01); *F17C 2205/0394* (2013.01); *F17C 2223/0123* (2013.01)

(58) Field of Classification Search
CPC .. F16K 15/026; F16K 15/033; F16K 27/0209; F15B 2211/30505; F17C 13/04; F17C 2205/0394; F17C 2223/0123
See application file for complete search history.

(56) References Cited

U.S. PATENT DOCUMENTS 2,991,918 A * 7/1961 Allen ...................... F17C 13/04
                                                      222/4
3,856,041 A * 12/1974 Cryder .................... F16K 17/26
                                                     137/493.6

FOREIGN PATENT DOCUMENTS

| EP | 1 493 962 A2 | 1/2005 |
| EP | 2 573 438 A1 | 3/2013 |
| JP | 2011-149502 A | 8/2011 |
| JP | 2012-219949 A | 11/2012 |

OTHER PUBLICATIONS

Aug. 7, 2020 extended Search Report issued in European Patent Application No. 20162715.5.

* cited by examiner

*Primary Examiner* — Reinaldo Sanchez-Medina
*Assistant Examiner* — Nicole Gardner
(74) *Attorney, Agent, or Firm* — Oliff PLC

(57) ABSTRACT

A valve device includes a body having a gas flow path. When the gas is charged, the first flow path is located upstream of the intersecting portion, and the second flow path is located downstream of the intersecting portion. The gas flow path has a check valve mechanism and a drive mechanism. The check valve mechanism opens a valve when the gas is charged and closes the valve when the gas charge is completed, and the drive mechanism opens the valve of the check valve mechanism and holds the open state of the valve of the check valve mechanism when the gas is discharged from the tank. The check valve mechanism includes a valve seat, and the valve seat is disposed in the first flow path.

8 Claims, 6 Drawing Sheets

VALVE DEVICE

CROSS-REFERENCE TO RELATED APPLICATION

This application claims priority to Japanese Patent Application No. 2019-047071 filed on Mar. 14, 2019, incorporated herein by reference in its entirety.

BACKGROUND

1. Technical Field

The present disclosure relates to a valve device.

2. Description of Related Art

There has been proposed a valve device shown in FIG. 2 (hereinafter referred to as a first example). A body portion 110 installed in a tank 100 is provided with a flow path 120 as an inlet. The flow path 120 communicates with a storage chamber in the tank 100 via a flow path 125 that is connected to an end of the flow path 120 so as to define a bend with respect to the flow path 120.

The body portion 110 is also provided with a flow path 130 as an outlet and a flow path 135 that is connected to an end of the flow path 130 so as to define a bend with respect to the flow path 130. A solenoid valve 140 is disposed in the flow path 135. When the solenoid valve 140 is opened, the flow path 135 communicates with the storage chamber. When filling the storage chamber with gas, the storage chamber is filled with high-pressure gas supplied via the flow path 120. When supplying the gas in the storage chamber to an external fuel cell, the solenoid valve 140 is opened so that the gas in the storage chamber is supplied to the fuel cell via the flow path 135 and the flow path 130.

A valve device having a configuration as described in Japanese Unexamined Patent Application Publication No. 2011-149502 (JP 2011-149502 A) is also known (hereinafter referred to as a second example). In JP 2011-149502 A, a body portion installed in a tank is provided with a flow path commonly used as an inlet and an outlet, and another flow path connected to an end of the above flow path so as to define a bend with respect to the above flow path. A solenoid valve disposed in a storage chamber is connected to the body portion. When filling the storage chamber with gas, the solenoid valve is opened and the storage chamber is filled with high-pressure gas supplied through the flow paths. When supplying the gas in the storage chamber to an external fuel cell, the solenoid valve is opened so that the gas in the storage chamber is supplied to the fuel cell via the flow paths.

The tanks in the first and second examples are filled with, for example, hydrogen gas and mounted on a fuel cell vehicle.

SUMMARY

In the first example, every time the storage chamber is filled with gas, a gas charging pressure is applied to the flow path 120 that serves as the inlet and the flow path 125. Accordingly, the pressure in the flow path 120 and the flow path 125 is increased from 0 MPa to, for example, 87.5 MPa. That is, a bending portion a (see FIG. 2) between the flow path 120 and the flow path 125 is exposed to pressure fluctuations the same number of times as the number of gas charges, and stress concentrates at the bending portion a. This may cause a decrease in pressure fatigue life. However, the pressure fluctuation on the inlet side occurs less frequently than the pressure fluctuation on the outlet side, which will be described later, and thus can be ignored.

In the tanks of the first and second examples, when the solenoid valve is closed and the pressure in the storage chamber is, for example, 87.5 MPa, the pressures in the flow path 135 and the flow path 130 is also 87.5 MPa. Hydrogen gas may be consumed on the fuel cell side with the solenoid valve closed. In this case, the pressure in the flow path 130 located downstream of the solenoid valve 140 is reduced to 0 MPa. Further, when the solenoid valve 140 is opened in this state, the pressure in the flow path 135 and the flow path 130 is increased from 0 MPa to 87.5 MPa. That is, a bending portion b at which the flow path 135 and the flow path 130 are connected so as to define a bend is exposed to pressure fluctuation every time the solenoid valve 140 is opened and closed. Therefore, stress concentrates at the bending portion b, which may cause a decrease in the pressure fatigue life.

In the first example, if the flow paths of the inlet and the outlet are commonly used, the bending portion of the flow path is exposed to pressure fluctuation both at the time of gas charge and at the time of gas discharge, thereby the pressure fatigue life is adversely affected.

The present disclosure provides a valve device that can suppress an adverse effect, regarding the pressure fatigue life, on the flow path of the body in which the gas flows when the tank is filled with gas and when the gas is discharged from the tank.

A valve device according to an aspect of the present disclosure includes a body. The body has a gas flow path. The gas flow path allows communication between an inside and an outside of the tank, and is configured to be commonly used when gas is charged into the tank and when the gas is discharged from the tank. The gas flow path includes a first flow path, a second flow path, and an intersecting portion in which the first flow path and the second flow path intersect each other. When the gas is charged, the first flow path is located upstream of the intersecting portion, and the second flow path is located downstream of the intersecting portion. The gas flow path has a check valve mechanism and a drive mechanism. The check valve mechanism is configured to open a valve when the gas is charged and close the valve when the gas charge is completed, and the drive mechanism is configured to open the valve of the check valve mechanism and hold the open state of the valve of the check valve mechanism when the gas is discharged from the tank. The check valve mechanism includes a valve seat, and the valve seat is disposed in the first flow path.

With the valve device according to the above aspect of the present disclosure, in the flow path between the inside of the tank and the check valve mechanism, the first flow path and the second flow path are connected at the portion in which the first flow path and the second flow path intersect each other. This portion is located at a position between the inside of the tank and the valve seat of the check valve mechanism, that is, a position closer to the inside of the tank with respect to the opening and closing position (valve seat position) of the flow path. Thus, the portion only receives a so-called tank pressure, and there is little change in the pressure in the portion.

Therefore, a load caused every time the gas is charged and discharged by pressure fluctuations at the position where the first flow path and the second flow path are connected so as to define a bend is small. This suppresses an adverse effect, regarding the pressure fatigue life, on the flow path of the body in which the gas flows.

In the valve device according to the above aspect of the present disclosure, the check valve mechanism may include a main valve that opens and closes the valve seat. The main valve may include a pilot chamber, a pilot passage, a pilot valve seat, and a pilot valve. The pilot passage may be configured to allow communication between a main valve hole of the valve seat and the pilot chamber. The pilot valve seat may be provided between the pilot passage and the pilot chamber. The pilot valve may be disposed so as to reciprocate in the pilot chamber and may be configured to open and close the pilot valve seat. The pilot valve may contact the pilot valve seat and may be urged by an urging member. The drive mechanism may be configured to open the main valve after opening the pilot valve when the gas is discharged from the tank.

With the valve device according to the above aspect of the present disclosure, when the gas is discharged from the tank, the drive mechanism first opens the pilot valve. This reduces a pressure difference between the pressure in the flow path at a position closer to the tank with respect to the valve seat and the pressure in the flow path at a position on the opposite side of the valve seat from the tank side. The drive mechanism then opens the main valve. Thus, the driving force of the drive mechanism that drives the main valve can be reduced. This eliminates the need to make the drive mechanism large in size to obtain the driving force for opening the main valve. In other words, the valve device can be reduced in size.

In the valve device according to the above aspect of the present disclosure, the tank may be a fuel tank, and the gas may be a gas that serves as a fuel. With the valve device according to the above aspect of the present disclosure, the above operations are easily achieved in the valve device provided in the fuel tank.

In the valve device according to the above aspect of the present disclosure, the fuel tank may be mounted on a vehicle. With the valve device according to the above aspect of the present disclosure, particularly in the valve device provided in the fuel tank mounted on the vehicle, the valve is frequently opened by the drive mechanism at the start of the vehicle and in accordance with the throttle valve opening degree. Also in this case, the adverse effect, regarding the pressure fatigue life, on the flow path of the body in which the gas flows is suppressed.

With the valve device according to the above aspect of the present disclosure, it is possible to suppress the adverse effect, regarding the pressure fatigue life, on the flow path of the body in which the gas flows when the tank is filled with gas and when the gas is discharged from the tank.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
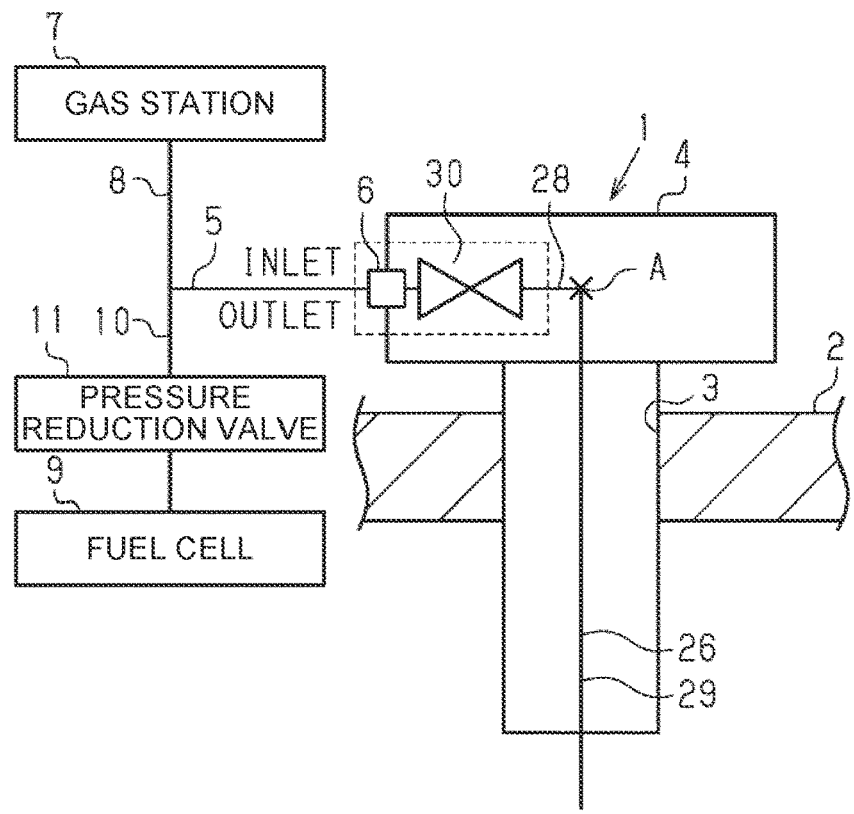
FIG. 1 is a schematic explanatory diagram of a valve device according to a first embodiment of the present disclosure.
Figure 2:
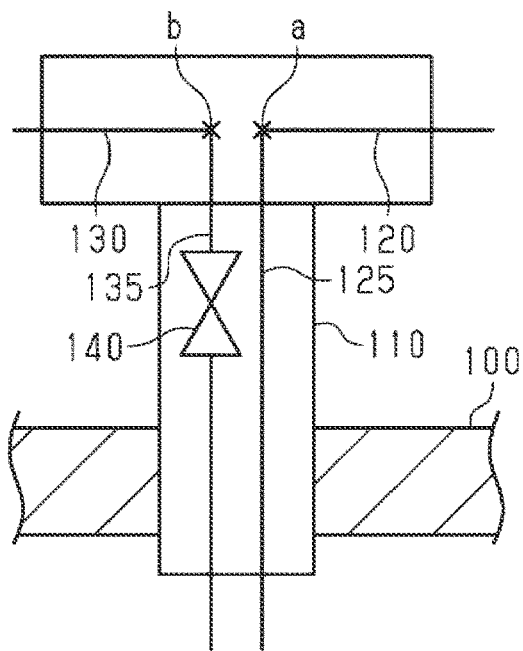
FIG. 2 is a schematic explanatory diagram of a valve device of a first example.

Hereinafter, a valve device according to a first embodiment implementing the present disclosure will be described with reference to FIG. 1 and FIGS. 3 to 5. A valve device 1 shown in FIG. 1 and FIGS. 3 to 5 has a body 4 installed in an installation port 3 of a tank 2 in which high-pressure (for example, 87.5 MPa) hydrogen gas is stored. The tank 2 is configured to be mounted on a vehicle. The valve device 1 includes a main valve 36, a pilot valve 43, a solenoid 47, and the like. The body 4 of the valve device 1 is made of aluminum alloy, and is connected to a pipe 5 commonly used as an inlet and an outlet via a joint 6. The pipe 5 is connected to a filling pipe 8 connected to a gas station 7 that is a supply source of the hydrogen gas and to a supply pipe 10 that supplies the hydrogen gas to a fuel cell 9.

A pressure reduction valve 11 for reducing pressure of the hydrogen gas supplied from the tank 2 to a predetermined pressure is connected to the supply pipe 10, and the hydrogen gas with reduced pressure is supplied to the fuel cell 9. The fuel cell 9 is mounted on the vehicle, and causes the vehicle to travel with power generated by the fuel cell 9.

Figure 3:
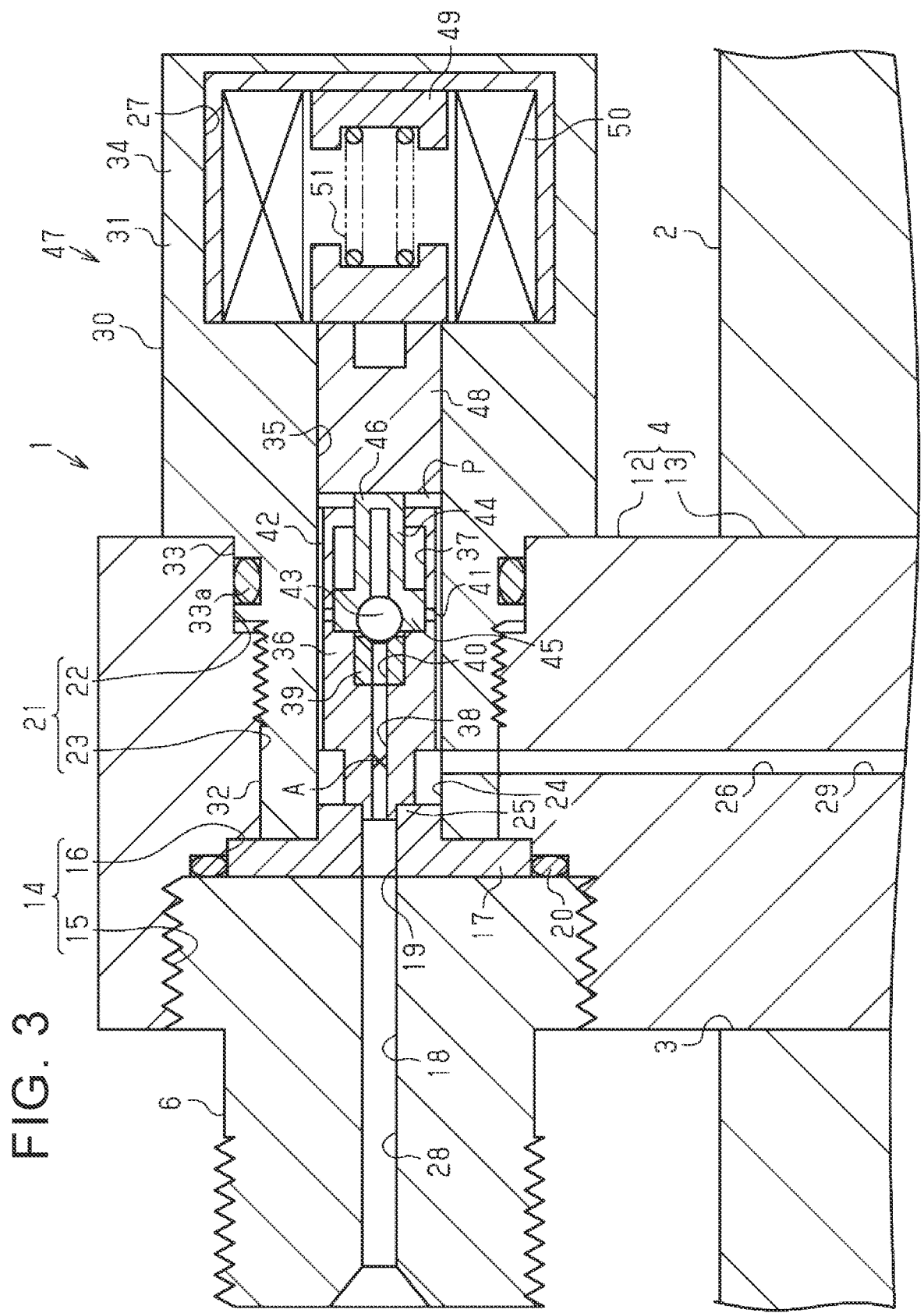
FIG. 3 is a sectional view of the valve device according to the first embodiment.

As shown in FIG. 3, the body 4 has a body portion 12 disposed outside the tank 2 and an installation portion 13 that is inserted in and fixed to the installation port 3. The installation portion 13 has a columnar shape extending downward in FIG. 3.

A stepped installation hole 14 having a large diameter portion 15 and a small diameter portion 16 is provided in a side portion of the body portion 12. An internal thread is provided on the large diameter portion 15, and the joint 6 is fixedly installed in the large diameter portion 15 by being screwed to the internal thread. A valve seat 17 is fitted to the small diameter portion 16. A passage 18 extends through the center of the joint 6 in its axial direction. The passage 18 is connected to the pipe 5 so as to communicate with the pipe 5 shown in FIG. 1. The valve seat 17 has an annular shape, is made from an elastically deformable hard resin such as polyimide resin, and has a main valve hole 19 having a circular section. The main valve hole 19 is coaxially disposed with the passage 18 and has the same diameter as the passage 18. A seal member 20 such as an O-ring that is in close contact with the joint 6 and the valve seat 17 is mounted in the small diameter portion 16.

A stepped installation hole 21 for installing a solenoid valve is provided in a side surface of the body portion 12 on the side opposite to the stepped installation hole 14 by 180 degrees. The stepped installation hole 21 has a large diameter portion 22 and a small diameter portion 23 in order from the installation port side of the solenoid valve to an inner side. An internal thread is provided on a part of an inner peripheral surface of the small diameter portion 23. A solenoid valve 30 is fixedly installed in the stepped installation hole 21.

As shown in FIG. 3, a housing 31 of the solenoid valve 30 has a bottomed cylindrical shape, and has a small diameter portion 32, a medium diameter portion 33, and a large diameter portion 34. The housing 31 is fixed to the body portion 12 by an external thread provided on a part of an outer peripheral surface of the small diameter portion 32 being screwed to the internal thread of the small diameter portion 23. The medium diameter portion 33 is fitted to the large diameter portion 22 of the stepped installation hole 21, and a seal member 33a, such as an O-ring, that is in close contact with an inner peripheral surface of the large diameter portion 22 is mounted on an outer peripheral surface of the medium diameter portion 33. The large diameter portion 34 of the housing 31 is disposed so as to protrude outward from the body 4, and an end surface of the large diameter portion 34 on the medium diameter portion 33 side is in contact with a side surface of the body 4. The valve seat 17 is interposed and fixed between an end surface of the small diameter portion 32 of the housing 31 and an inner end surface of the joint 6. A sliding hole 35 extends through the center of the housing 31 in its axial direction. The sliding hole 35 is disposed coaxially with the passage 18, and is opened on the valve seat 17 side. A seat portion 25 of the valve seat 17 is fitted to the opening of the sliding hole 35.

A main valve 36 is disposed in the sliding hole 35 so as to be slidable in its axial direction. That is, the main valve 36 can reciprocate between a closed valve position (see FIG. 3) and an opened valve position (see FIG. 5). In the closed valve position, the main valve 36 contacts the seat portion 25 of the valve seat 17 to close the main valve hole 19. In the opened valve position, the main valve 36 is disposed away from the seat portion 25 to open the main valve hole 19. The main valve 36 has a cylindrical shape. In the sliding hole 35, a space between the main valve 36 and the valve seat 17 at the opened valve position is defined as a valve chamber 24. The valve chamber 24 communicates with a storage chamber of the tank 2 through a passage 26 provided in the small diameter portion 32 and the installation portion 13.

A pilot chamber 37 is provided at a base end of the main valve 36. An inner diameter of the pilot chamber 37 is larger than that of the passage 26. A pilot passage 38 extends through the main valve 36 from a distal end thereof so as to communicate with the pilot chamber 37. A sectional area of the pilot passage 38 is smaller than that of the passage 18.

A pilot valve seat 39 is fitted to an inner surface of an open end, which is adjacent to the pilot chamber 37, of the pilot passage 38. The pilot valve seat 39 has an annular shape, is made from an elastically deformable hard resin such as polyimide resin, and has a pilot valve hole 40 with a circular section. The pilot chamber 37 communicates with the pilot passage 38 via the pilot valve hole 40. The pilot chamber 37 has a communication hole 41 in a part of a side wall of the main valve 36, which is located closer to the pilot valve seat 39, and communicates with the sliding hole 35 via the communication hole 41. The pilot chamber 37 has a through hole (not shown) in an end wall facing a plunger 48 described later, and the pilot chamber 37 communicates with a space P between the end wall and the plunger 48 via the through hole.

On an outer peripheral surface of the main valve 36, a plurality of communication grooves 42 communicating with the communication hole 41 are provided so as to extend in the axial direction. In the present embodiment, the communication grooves 42 are disposed at equal pitches to each other, but the communication grooves 42 need not be disposed at equal pitches, and the pitches at which the communication grooves 42 are disposed are not limited. The number of communication grooves 42 may be one. The valve chamber 24 can communicate with the pilot chamber 37 via the communication grooves 42 and the communication hole 41.

A valve support 44 is disposed in the pilot chamber 37 so as to be reciprocally movable in the axial direction. The valve support 44 has a stepped columnar shape, supports the pilot valve 43, and has a large diameter portion 45 and a small diameter portion 46. The large diameter portion 45 is slidable in the pilot chamber 37. The small diameter portion 46 protrudes outward and is slidable with respect to the end wall of the pilot chamber 37. With reciprocating movement of the valve support 44, the pilot valve 43 contacts and moves away from the pilot valve seat 39, thereby the pilot valve 43 can be closed and opened.

A storage chamber 27 is provided in the large diameter portion 34 of the housing 31. A solenoid 47 is provided in the storage chamber 27. The solenoid 47 generates a driving force for opening the main valve 36 and the pilot valve 43, and includes the plunger 48, a fixed core 49, an electromagnetic coil 50, and the like.

The plunger 48 is made of a magnetic material and has a substantially cylindrical shape extending in a rod shape in the axial direction. The plunger 48 is disposed in the sliding hole 35 so as to be slidable with respect to the sliding hole 35 in the axial direction, and is integrally connected to the small diameter portion 46 of the valve support 44. The plunger 48, the pilot valve 43, and the main valve 36 are disposed so as to be coaxial with each other.

The fixed core 49 disposed in the storage chamber 27 is made of magnetic material and is fixed to a bottom portion of the storage chamber 27. The fixed core 49 has a substantially cylindrical shape, and is disposed to face a base end of the plunger 48 so as to be coaxial with the plunger 48. The electromagnetic coil 50 is constituted of coils wound around a bobbin (not shown), and is disposed so as to surround the plunger 48 and the fixed core 49.

A coil spring 51 serving as an urging member is disposed such that one end thereof is in contact with the base end of the plunger 48 and the other end is in contact with the fixed core 49. The coil spring is configured to press the plunger 48 to close the pilot valve 43, and in this state, urge the main valve 36 toward the valve seat 17. An urging force of the coil spring 51 is set to, when the tank 2 is filled with gas, that is, when a gas pressure for charging the hydrogen gas is applied from the passage 18, open the main valve 36, and when the gas charge from the passage 18 is completed and the gas pressure for charging the hydrogen gas is no longer applied, close the main valve 36.

In the present embodiment, a check valve mechanism is constituted of the valve seat 17, the main valve 36, the pilot passage 38, the pilot valve 43, and the coil spring 51 (urging member). The solenoid 47 can be regarded as a drive mechanism.

As shown in FIG. 3, in the present embodiment, a first flow path 28 serving as the gas flow path includes the passage 18, the main valve hole 19, and a part of the valve chamber 24. That is, the part of the valve chamber 24 positioned on an extension line of the main valve hole 19 is included in the first flow path 28.

A second flow path 29 serving as the gas flow path includes a passage 26 and a part of the valve chamber 24. That is, the part of the valve chamber 24 positioned on an extension line of the passage 26 is included in the second flow path 29. The valve chamber 24 can be regarded as a portion A in which the first flow path 28 and the second flow path 29 intersect each other. Although the portion A appears to be in the pilot passage 38 in FIG. 3, the portion A indicates a point in a space corresponding to the intersection of extended center lines of the flow paths 28, 29.

Operation of First Embodiment

The operation of the valve device 1 configured as described above will be described with reference to FIG. 1 and FIGS. 3 to 5.

FIG. 3 shows a state where both the main valve 36 and the pilot valve 43 of the valve device 1 are closed. That is, with the urging force of the coil spring 51 pressing the plunger 48, the pilot valve 43 is closed and the main valve 36 is closed.

Here, reference sign P2 represents the pressure in the storage chamber of the tank 2, reference sign P3 represents the pressure in the space P surrounded by the end wall of the main valve 36 and the plunger 48, and reference sign P1 represents the pressure in the passage 18. In FIG. 3, P1<P2 is established. In this state, the space P surrounded by the end wall of the main valve 36 and the plunger 48 communicates with the passage 26 via the communication grooves 42 and the valve chamber 24. Thus, P3=P2 (pressure in the space P=pressure in the storage chamber of the tank 2) is established.

Accordingly, in this state, the pilot valve 43 is closed against the pressure P1 in the pilot passage 38 (passage 18) with the urging force of the coil spring 51. A sectional area S1 of the main valve hole 19 is smaller than an area S3 of the end surface of the main valve 36, which faces the plunger 48. The main valve 36 is closed with the pressure generated by this area difference and the urging force of the coil spring 51.

Figure 4:
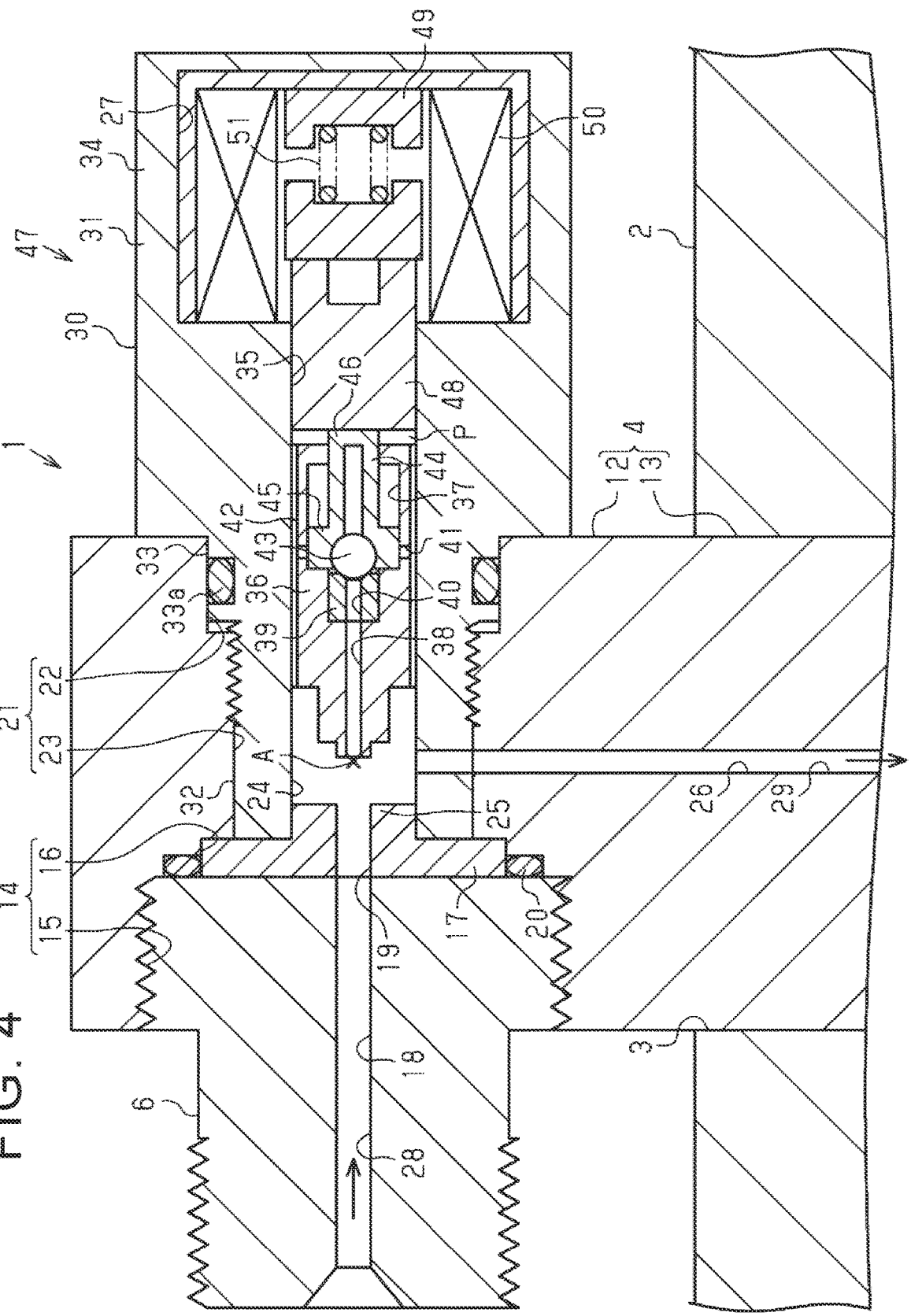
FIG. 4 is another sectional view of the valve device according to the first embodiment.
Figure 5:
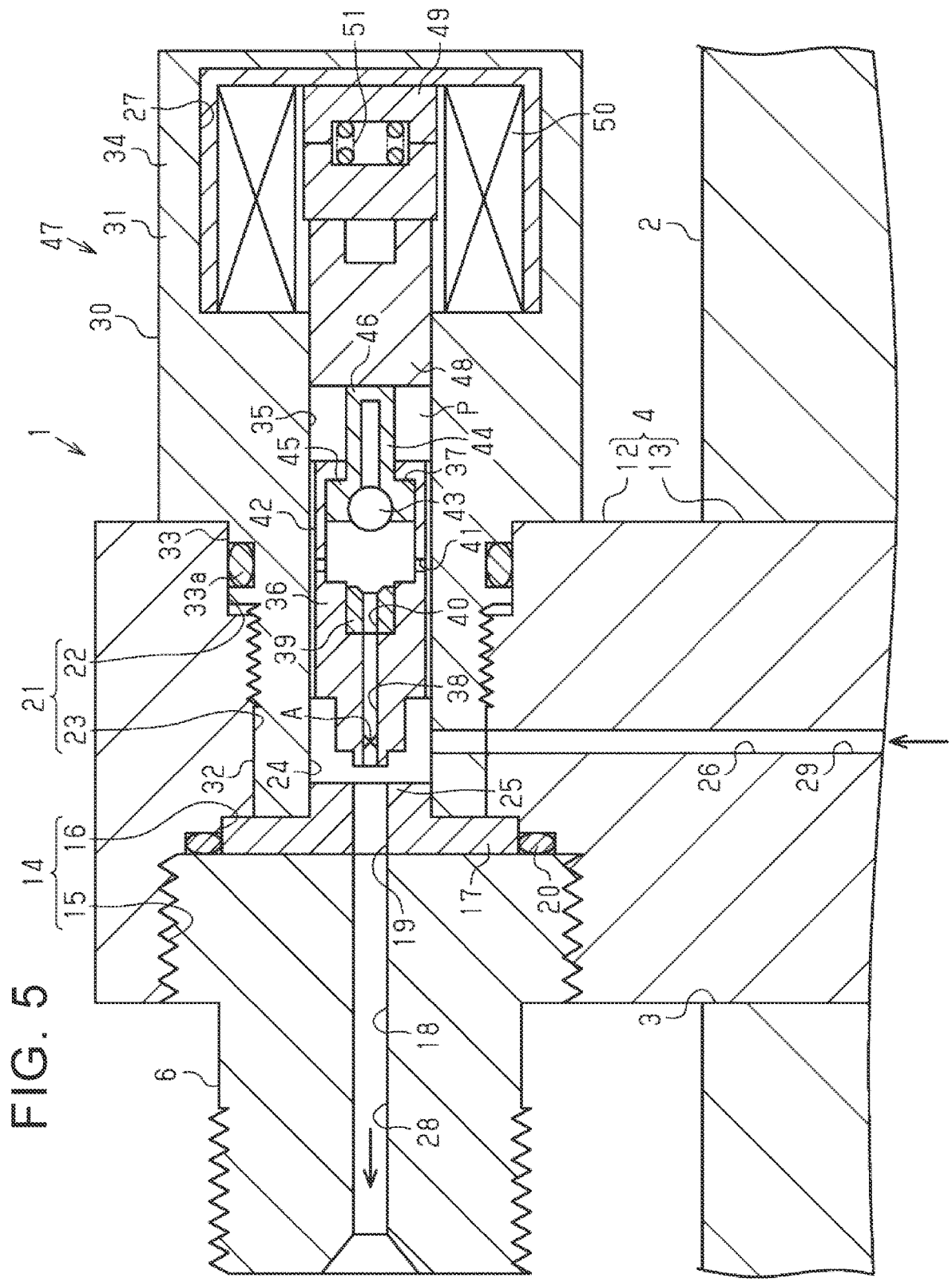
FIG. 5 is still another sectional view of the valve device according to the first embodiment.

When charging the hydrogen gas, as shown in FIG. 4, the hydrogen gas is supplied from the passage 18, and the pressure P1 causes the main valve 36 and the pilot valve 43 to move to the right, while maintaining the relationship shown in FIG. 3, against the urging force of the coil spring 51. Thereby, the main valve hole 19 is opened. With the main valve hole 19 opened, the hydrogen gas is stored in the storage chamber of the tank 2 via the second flow path 29. When the charge of the hydrogen gas is completed, the pilot valve 43 is closed with the urging force of the coil spring 51.

When the hydrogen gas in the storage chamber of the tank 2 is discharged to the fuel cell 9, the electromagnetic coil 50 is excited. With this excitation, the plunger 48 opens the valve support 44 against the urging force of the coil spring 51, thereby moving the pilot valve 43 away from the pilot valve seat 39. Thereafter, the large diameter portion 45 of the valve support 44 is engaged with the end wall of the main valve 36, thereby opening the main valve 36 (see FIG. 5). Accordingly, the hydrogen gas is supplied from the storage chamber of the tank 2 to the fuel cell 9 via the passage 26, the valve chamber 24, the main valve hole 19, the passage 18, and the like. When the electromagnetic coil 50 is demagnetized, the main valve 36 and the pilot valve 43 are returned to the state shown in FIG. 3 and are both closed with the urging force of the coil spring 51 and the like.

The present embodiment has the following features.

(1) The valve device 1 of the present embodiment has the body 4 including the gas flow path that allows communication between an inside and an outside of the tank 2, and that is commonly used when charging the gas into the tank 2 and when discharging the gas from the tank 2. The gas flow path has the first flow path 28, the second flow path 29, and the portion A in which the both flow paths intersect each other, that is, the valve chamber 24. When the gas is charged, the first flow path 28 is located upstream of the valve chamber 24 (intersecting portion A) and the second flow path 29 is located downstream of the valve chamber 24 (intersecting portion A). The gas flow path includes the check valve mechanism that opens the valves when the gas is charged and closes the valves when the gas charge is completed, as well as the solenoid 47 (drive mechanism) that opens valves of the check valve mechanism and holds an open state of the valves when the gas is discharged from the tank 2.

Further, the valve seat 17 included in the check valve mechanism is disposed in the first flow path 28.

According to the above configuration, the first flow path 28 and the second flow path 29 are connected to each other in the valve chamber 24 (intersecting portion A). The valve chamber 24 is located between the inside of the tank 2 and the valve seat 17 of the check valve mechanism. That is, since the valve chamber 24 is located closer to the inside of the tank with respect to an opening and closing position (valve seat position) of the flow path, the valve chamber 24 only receives a so-called tank pressure, and there is little change in the pressure in the valve chamber 24. Therefore, a load caused every time the gas is charged and discharged by pressure fluctuations at a position where the first flow path 28 and the second flow path 29 are connected so as to define a bend is small. This suppresses an adverse effect, regarding the pressure fatigue life, on the flow path of the body 4 in which the gas flows.

The number of times of gas discharge is generally larger than that of gas charge. Thus, there is a great advantage in suppressing an adverse effect, regarding the pressure fatigue life, on the flow path of the body in which the gas flows, particularly by eliminating a bent portion from a path between the outlet path subjected to high load and a seal (valve seat) of the solenoid valve.

In addition, since the joints of the outlet and the inlet are not concentratedly disposed on an installation end portion of the body 4, a joint base is reduced in size, that is, the installation end portion for installing the joint is reduced in size. Thus, there is an advantage that the size of the valve device can be reduced. This also makes it possible to reduce the cost of the valve device 1.

(2) In the present embodiment, the check valve mechanism has the main valve 36 that opens and closes the valve seat 17. The main valve 36 includes the pilot chamber 37, the pilot passage 38 that connects the main valve hole 19 of the valve seat 17 and the pilot chamber 37, the pilot valve seat 39 provided between the pilot passage 38 and the pilot chamber 37, and the pilot valve 43 that is provided in the pilot chamber 37 so as to be reciprocally movable and that opens and closes the pilot valve seat 39. The pilot valve 43 is urged by the coil spring 51 (urging member) that causes the pilot valve 43 to contact the pilot valve seat 39. When the gas is discharged from the tank 2, the solenoid 47 (drive mechanism) opens the pilot valve 43 and then opens the main valve 36.

As a result, according to the present embodiment, when the gas is discharged from the tank 2, the solenoid 47 (drive mechanism) first opens the pilot valve 43. This reduces a pressure difference between the pressure in the flow path at a position closer to the tank with respect to the valve seat 17 and the pressure in the flow path at a position on the opposite side of the valve seat 17 from the tank side. Thereafter, the solenoid 47 (drive mechanism) opens the main valve 36. Thus, the driving force of the solenoid 47 (drive mechanism) that drives the main valve 36 can be reduced. This eliminates the need to make the drive mechanism large in size to obtain the driving force for opening the main valve 36. In other words, the valve device 1 can be reduced in size.

(3) In the present embodiment, the tank 2 is a fuel tank, and the gas is a gas that serves as a fuel. Thus, in the valve device 1 provided in the fuel tank, the above operations (1) and (2) can be easily achieved.

(4) In the present embodiment, the tank 2 is mounted on a vehicle. Thus, according to the present embodiment, particularly in the valve device 1 provided in the fuel tank mounted on the vehicle, the valve is frequently opened by the drive mechanism at the start of the vehicle and in accordance with the throttle valve opening degree. Also in this case, the adverse effect, regarding the pressure fatigue life, on the flow path of the body in which the gas flows can be suppressed.

Second Embodiment

Next, the valve device 1 according to a second embodiment will be described with reference to FIGS. 6 and 7. In the present embodiment, configurations that differ from the configurations of the first embodiment will be described. The same configurations will be denoted by the same reference signs, and detailed description thereof will be omitted.

The valve device 1 of the present embodiment differs from that of the first embodiment in that the pilot passage 38, the pilot valve seat 39, the pilot valve hole 40, the communication hole 41, the communication grooves 42, the pilot valve 43, and the valve support 44 are not included. In addition, the plunger 48 and the main valve 36 are integrally connected and fixed to each other. The check valve mechanism of the present embodiment is constituted of the valve seat 17, the main valve 36, the plunger 48, and the coil spring 51.

Operation of Second Embodiment

The operation of the valve device 1 configured as described above will be described. FIG. 6 shows a state in which the main valve 36 of the valve device 1 is closed. That is, the urging force of the coil spring 51 presses the plunger 48 to close the main valve 36.

Figure 7:
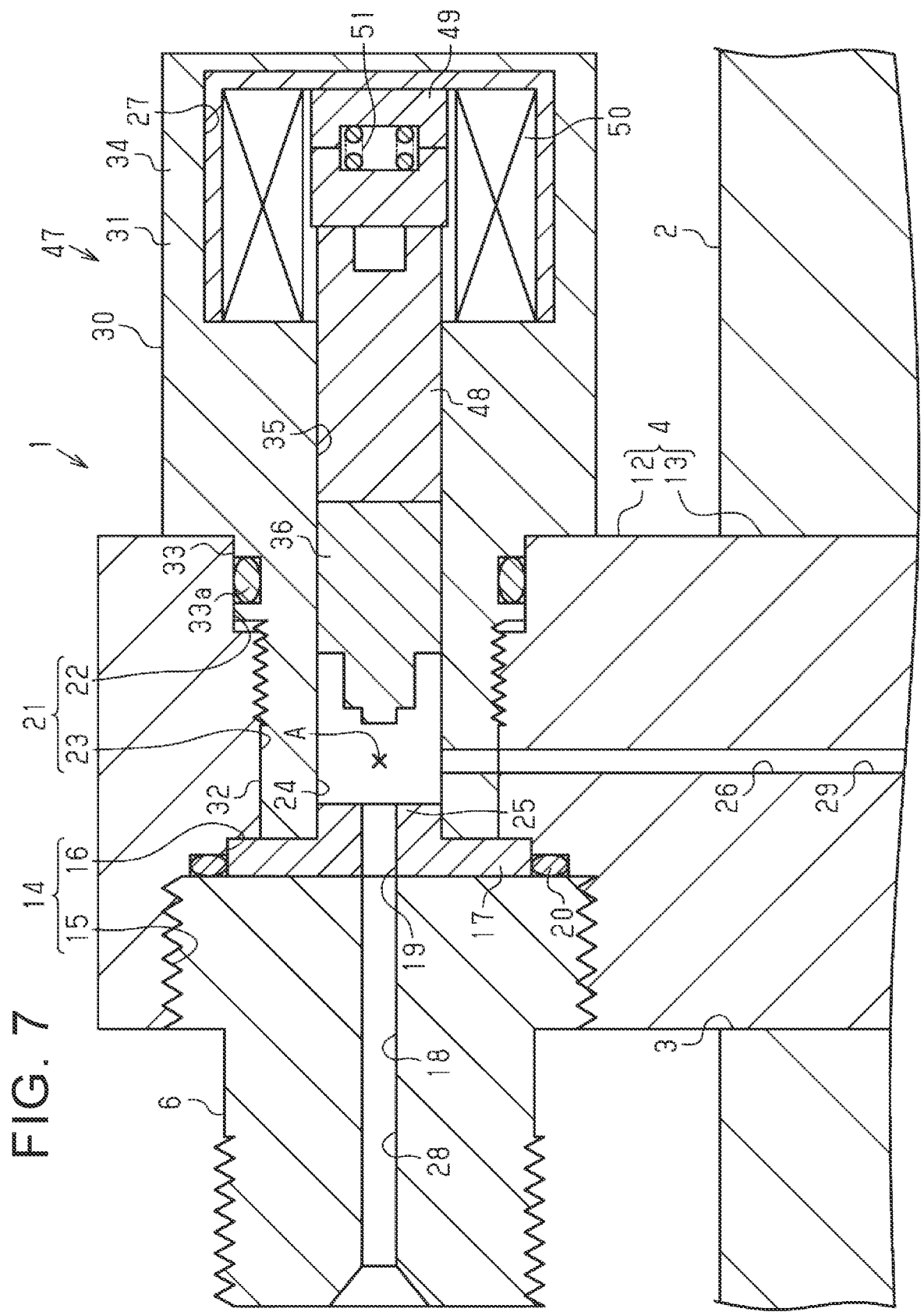
FIG. 7 is another sectional view of the valve device according to the second embodiment.

When the hydrogen gas is charged, as shown in FIG. 7, the hydrogen gas is supplied from the passage 18, and the pressure caused by the supply of the hydrogen gas opens the main valve 36 against the urging force of the coil spring 51. With the main valve 36 opened, the hydrogen gas is stored in the storage chamber of the tank 2 via the valve chamber 24 and the passage 26. When the charge of hydrogen gas is stopped, the main valve 36 is closed by the urging force of the coil spring 51.

When the hydrogen gas in the storage chamber of the tank 2 is discharged to the fuel cell 9, the electromagnetic coil 50 is excited. With this excitation, the plunger 48 moves the main valve 36 away from the valve seat 17 against the urging force of the coil spring 51. Accordingly, the hydrogen gas is supplied from the storage chamber of the tank 2 to the fuel cell 9 via the passage 26, the valve chamber 24, the main valve hole 19, the passage 18, and the like.

Figure 6:
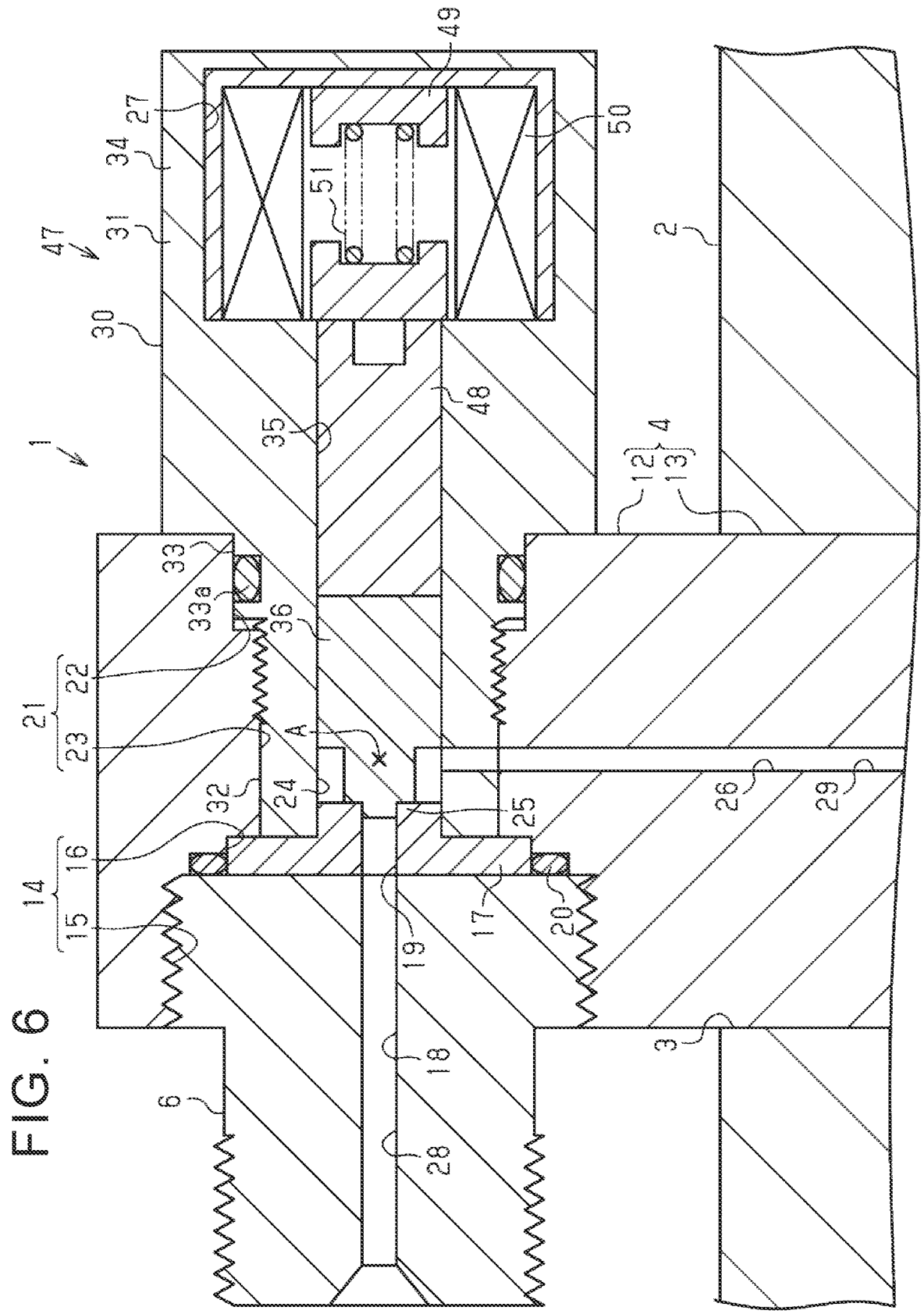
FIG. 6 is a sectional view of a valve device according to a second embodiment.

When the electromagnetic coil 50 is demagnetized, the main valve 36 returns to the state shown in FIG. 6 and closes with the urging force of the coil spring 51. The valve device 1 of the present embodiment having the configuration described above can also easily achieve the same functions and effects as those of (1), (3), and (4) in the first embodiment.

The applicable embodiment is not limited to the above embodiments and may be modified as follows.
In the embodiments described above, hydrogen gas is described as a fluid. However, it goes without saying that a fluid other than hydrogen gas (for example, methane gas, propane gas, and LPG gas), a liquid fuel, a gas-liquid mixture may be applied. When natural gas is used as the fluid, the present disclosure can be applied to a fuel tank for a compressed natural gas (CNG) vehicle.

In the embodiments described above, the solenoid 47 serves as the drive mechanism, but the drive mechanism is not limited to the solenoid. For example, a forward/reverse rotation of a motor may be converted into a reciprocating motion via a linear reciprocating conversion mechanism to drive the main valve.

What is claimed is:

1. A valve device comprising a body, the body having a gas flow path, wherein:
the valve device is for a high-pressure gas tank;
the gas flow path is configured to allow communication between an inside and an outside of the high-pressure gas tank, and is configured to be commonly used when gas is charged into the high-pressure gas tank and when the gas is discharged from the high-pressure gas tank;
the gas flow path has a first flow path, a second flow path, and an intersecting portion in which the first flow path and the second flow path intersect each other outside of the high-pressure gas tank, and when the gas is charged, the first flow path is located upstream of the intersecting portion, and the second flow path is located downstream of the intersecting portion;
the gas flow path has a check valve mechanism and a drive mechanism, the check valve mechanism is configured to open a valve when the gas is charged and close the valve when gas charge is completed, and the drive mechanism is configured to open the valve of the check valve mechanism and hold an open state of the valve of the check valve mechanism when the gas is discharged from the high-pressure gas tank;
the check valve mechanism includes a valve seat, the valve seat being disposed in the first flow path;
the valve has a main valve that opens and closes the valve seat; and
the intersecting portion includes a point at which a first axis of the first flow path and second axis of the second flow path intersect, and the point is within the main valve.

2. The valve device according to claim 1, wherein:
the main valve includes a pilot chamber, a pilot passage, a pilot valve seat, and a pilot valve, the pilot passage being configured to allow communication between a main valve hole of the valve seat and the pilot chamber, the pilot valve seat being provided between the pilot passage and the pilot chamber, the pilot valve being disposed so as to reciprocate in the pilot chamber and being configured to open and close the pilot valve seat, and the pilot valve contacting the pilot valve seat and being urged by an urging member; and
the drive mechanism is configured to open the pilot valve and then open the main valve when the gas is discharged from the high-pressure gas tank.

3. The valve device according to claim 2, wherein the high-pressure gas tank is a fuel tank, and the gas serves as a fuel.

4. The valve device according to claim 3, wherein the fuel tank is configured to be mounted on a vehicle.

5. A valve device for pressurizing a tank with gas, the valve device comprising
a body with a gas flow path configured to allow communication between inside and outside of the tank, and be commonly used when the gas is charged into the tank and when the gas is discharged from the tank, wherein
the gas flow path has a first flow path, a second flow path, and an intersection at which the first flow path and the second flow path intersect each other outside of the tank, and when the tank is charged with the gas, the first flow path is upstream of the intersection, and the second flow path is downstream of the intersection;

a check valve within the gas flow path, the check valve being configured to open when the gas is charged into the tank and close when gas is not charged into the tank; and a drive mechanism configured to open the check valve and hold the check valve open when the gas is discharged from the tank; wherein the check valve includes a valve seat in the first flow path, the check valve has a main valve that opens and closes the valve seat, and the intersection includes a point at which a first axis of the first flow path and second axis of the second flow path intersect, and the point is within the main valve.

6. The valve device according to claim 5, wherein:

the main valve includes a pilot chamber, a pilot passage, a pilot valve seat, and a pilot valve, the pilot passage is configured to allow communication between a main valve hole of the valve seat and the pilot chamber, the pilot valve seat is between the pilot passage and the pilot chamber, the pilot valve is configured to reciprocate in the pilot chamber and open and close the pilot valve seat, the pilot valve is configured to contact the pilot valve seat and is biased by a spring toward the pilot valve seat, and the drive mechanism is configured to open the pilot valve and then open the main valve when the gas is discharged from the tank.

7. The valve device according to claim 5, wherein the tank is a fuel tank, and the gas serves as a fuel.

8. The valve device according to claim 7, wherein the fuel tank is configured to be mounted on a vehicle.

* * * * *